LUMINESCENT MEMORY AND DISPLAY DEVICE

Filed April 17, 1968 2 Sheets-Sheet 1

INVENTOR

TADAO KOHASHI

BY Stevens, Davis, Miller & Mosher

ATTORNEYS

LUMINESCENT MEMORY AND DISPLAY DEVICE

Filed April 17, 1968 2 Sheets-Sheet 2

INVENTOR
TADAO KOHASHI

BY Stevens, Davis, Miller & Mosher
ATTORNEYS

United States Patent Office 3,550,095
Patented Dec. 22, 1970

3,550,095

LUMINESCENT MEMORY AND DISPLAY DEVICE

Tadao Kohashi, Yokohama, Japan, assignor to Matsushita Electric Industrial Co., Ltd., Osaka, Japan, a corporation of Japan Filed Apr. 17, 1968, Ser. No. 722,072
Claims priority, application Japan, May 2, 1967, 42/28,545
Int. Cl. G11c *11/42*
U.S. Cl. 340—173 8 Claims

ABSTRACT OF THE DISCLOSURE

An electronic device which stores either electric or radiated information and provides a luminescent display of the stored information, comprising a luminescent element comprising electroluminescent material contained in a dielectric substrate, means for applying a DC voltage to polarize said luminescent element, means for exciting said element with an AC voltage so that said element provides a luminescent display representing the electric field remaining within said element, and means for erasing said residual electric field by applying a DC voltage which is opposite in polarity to the previously mentioned polarizing DC voltage.

This invention is intended to provide a luminescent memory and display device in which an electroluminescent material is utilized for writing-in an information signal and for luminescent display (read-out) of the stored information or erasing of the same, and which can further provide the display in a intermediate tone.

A luminescent memory and display device according to this invention includes, as a constituent element, a luminescent element which comprises electroluminescent material dispersed in a dielectric substrate of the unidirectional electric energy storage type which supports the internal electric field when an external polarizing direct (unidirectional) voltage is applied thereto and which maintains the residual component of said electric field when said external voltage has been removed therefrom.

Writing of the signal to be stored and displayed is carried out by forming a unidirectional internal field in said luminescent element or by controlling said internal field in response to an input signal, said internal field being formed as a residual when an external polarizing unidirectional voltage is applied to said luminescent element in such manner that the polarity of the luminescent output side of said element is positive against the opposite side and then said polarizing voltage is removed.

Luminescent display of the stored information, that is, luminescent read-out, is performed by exciting the luminescent element with alternating voltage. Erasing of the stored (written) information is performed by applying to the element a unidirectional voltage in such manner that the polarity of the luminescent output side of the element is negative against the opposite side and thus extinguishing the remaining internal electric field.

The principle of this invention has been described briefly in the preceding paragraphs, and now, detail of the invention will be described hereunder in connection with embodiments of the invention and referring to the attached drawings, in which.

Figures 1, 2A, 2B, 2C, 2D, 3A, 3B, 3C, 3D, 3E:
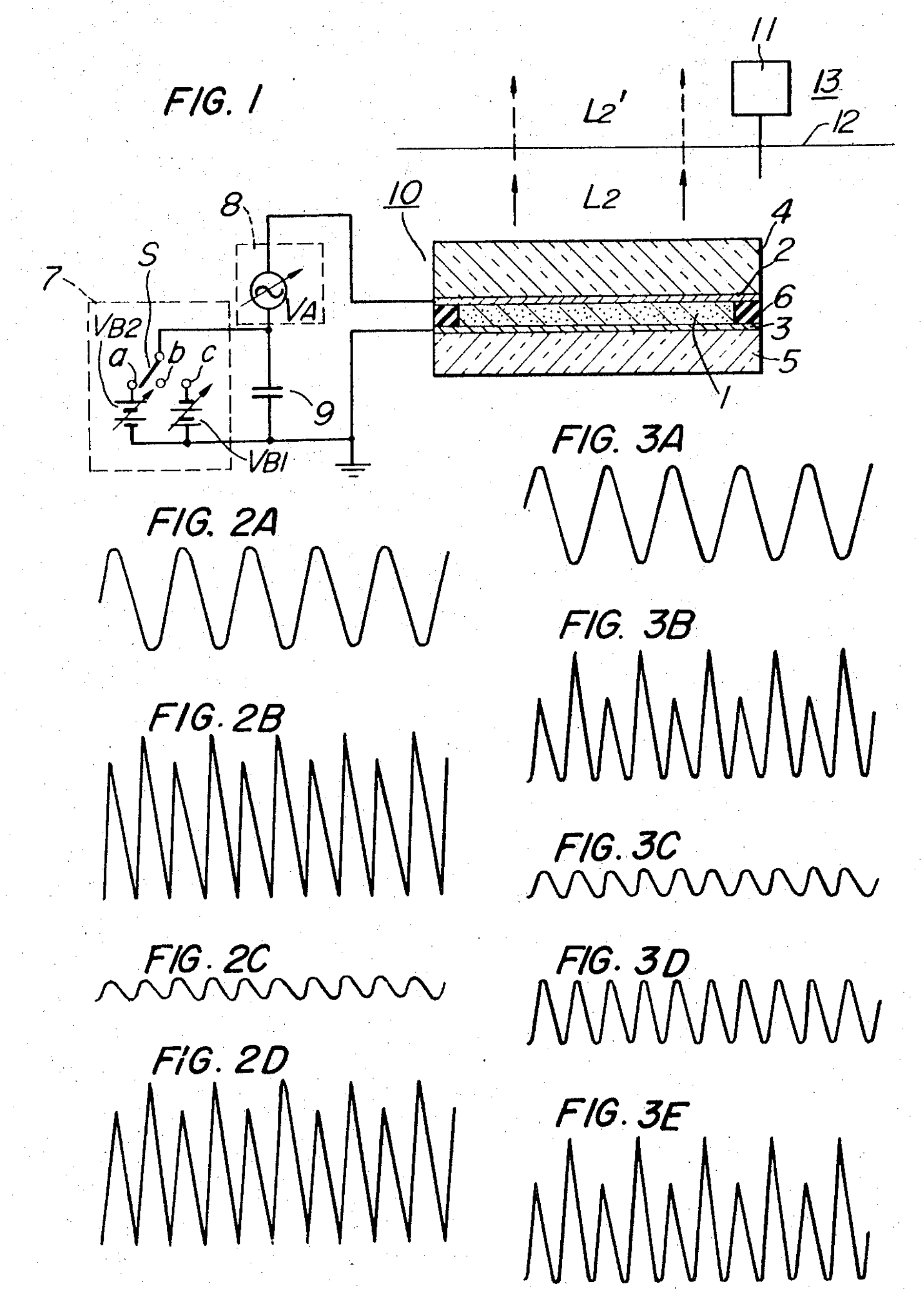
FIG. 1 is a sectional view illustrating the construction of the luminescent element shown with an electrical connection diagram in an embodiment of the luminescent memory and display device of this invention.
FIGS. 2A–2D and FIGS. 3A–3E show wave-forms observed on an oscilloscope in experiments on the device shown in FIG. 1.

In different figures, corresponding elements with a similar function are indicated by the same reference numerals. Further, it will be noted that the relative sizes of various elements shown in the figures are not necessarily corresponding to those explained in the specification as they are drawn out of proportion for convenience's sake.

Now, referring to FIG. 1, the luminescent element 10 consists of a layer of electroluminescent material dispersed in a dielectric substrate (hereafter, referred to as AC–DC EL layer) 1 interposed between a pair of electrodes 2 and 3 at least one of which is light-pervious, said dielectric substrate being of such property that it supports the internal electric field when an external polarizing direct voltage is applied to it and maintains the residual component of said electric field when said polarizing voltage has been removed. In this embodiment, the AC–DC EL layer 1 comprises, for example, powder of ZnS green electroluminescent material activated with Cu or Al, said powder being dispersed in the dielectric substrate, for example, of tricresyl phosphate and said layer being formed with a thickness of the order of 100 microns. The electrodes 2 and 3 are formed with a transparent electroconductive film of tin oxide or the like deposited on the transparent glass plates 4 and 5 respectively. The insulating spacer 6 is made, for example, of polyester film.

In FIG. 1, the luminescent output $L_2$ is taken out from the side of the layer 1 adjacent to the electrode 2. The direct (unidirectional) voltage source 7 which constitutes means for writing and erasing of the electric signal, supplies variable DC voltages $V_{B1}$ and $V_{B2}$ of opposite polarities, through the switch S, to the AC voltage source 8 which constitutes means for exciting the layer 1 for luminescent read-out. The AC voltage source 8 supplies AC voltage $V_A$ of variable amplitude. The voltage source 7 for writing and erasing and the luminescence exciting voltage source 8 are connected to the electrodes 2 and 3 together with the capacitor 9, as shown in the figure. That is; the AC voltage source 8 and the capacitor 9 are connected in series between the electrodes 2 and 3, and the DC voltage source 7 is connected in parallel with the capacitor 9. A resistor of appropriate value may be connected across the capacitor 9 to discharge the capacitor 9. Or, the capacitor 9 may be removed from the circuit.

FIG. 2A–20D show wave-forms observed on an oscilloscope during an experiment with the device shown in FIG. 1. FIG. 2A is a wave-form of the luminescence exciting or read-out AC voltage $V_A$ which is an AC voltage of 80 v., 1 kc. in the present experiment and measured as variation of the potential at the electrode 2 in the luminescent output side against the other electrode 3.

FIG. 2B is a wave-form of the luminescent output $L_2$ when the AC voltage $V_A$ as shown in FIG. 2A is applied to the luminescent element 10, in a state where there is no residual electric field component within the AC–DC EL layer which is produced by applying an external polarizing unidirectional voltage to said layer from the voltage source 7 in such manner that the polarity of the electrode 2 is positive against the electrode 3 and that the switch S is turned to the position *b* (that is; in a state that any signal has been completely eliminated in the layer).

FIG. 2C is a wave-form of the luminescent output $L_2$ observed when the luminescence exciting AC voltage $V_A$ is applied to the layer at the expiration of five minutes after an input signal of rectangular wave-form having an amplitude of 240 v. (voltage of $V_{B2}$) was written in the layer by turning the switch S to the position *a* for one second with zero AC voltage $V_A$ and then turning back to the position *b*.

The polarity of the writing signal $V_{B2}$ is such that the electrode 2 is positive against the electrode 3. It will be clearly understood from comparison of the wave-form of FIG. 2C with the wave-form of FIG. 2B that the luminescent output $L_2$ is remarkably decreased by the residual polarized electric field. This decrease in output is more pronounced in the higher values of the writing signal $V_{B2}$, gradually approaching the state of FIG. 2B with the attenuation of the residual polarized electric field. However, the time constant of the attenuation is usually in a range of a few tens of minutes to a few hours. Therefore, the element can be used for memory and luminescent display of an input signal.

Erasing of the memory is achieved by extinguishing the residual polarized electric field produced by application of the voltage $V_{B2}$; that is, by turning the switch S to the position *c* to apply the DC voltage $V_{B1}$ which is opposite in polarity to the voltage $V_{B2}$, to the element 10 at the selected value and time so as to sufficiently cancel and extinguish the above-mentioned residual polarized field.

The intensity of the residual polarized field decreases as the time elapsed after removal of the writing signal. Therefore, the lower limits of the voltage and the applying period of the erasing signal can be set approximately at the same values as those of the writing signal or at lower values depending on the time elapsed after the writing-in. However, it will be less troublesome and more practical if the voltage and the applying period are set at values approximately the same as or higher than those of the writing signal.

FIG. 2D is a wave-form of the luminescent output $L_2$ observed when the luminescence exciting AC voltage $V_A$ is applied to the layer after an erasing signal of 400 v. (voltage of $V_{B1}$) was applied for one second by turning the switch S to the position *c* with zero AC voltage $V_A$ and then turning the switch to the neutral position *b* to stop the application of the DC voltage. In this state, the residual polarized field component due to the writing signal $V_{B1}$ is removed, resulting in an increased luminescent output $L_2$. It will be clear from comparison of the wave-forms shown in FIGS. 2D and 2B that the luminescent output corresponding to the wave-form of FIG. 2B has been restored.

In the above-described operation, the internal electric field which remains when the external polarizing unidirectional voltage which is of positive polarity in the luminescent output side in relation to the opposite side is applied to the element and then removed from it, is formed unidirectionally in response to the input signal. In such an embodiment, the intensity of the luminescent output $L_2$ decreases in response to the intensity of the input signal.

Wave-forms shown in FIG. 3 have been obtained from an experiment in which said internal electric field is unidirectionally controlled to display the stored signal in an amplified intensity of the luminescent output $L_2$ in response to the intensity of the input signal.

The luminescence exciting AC voltage $V_A$ used in the following experiment is the same as that shown in FIG. 2A, as indicated in FIG. 3A. FIG. 3B is a wave-form of the luminescent output $L_2$ in a state corresponding to FIG. 2B.

FIG. 3C is a wave-form of the luminescent output $L_2$ observed when a luminescence exciting voltage $V_A$ (wave-form of FIG. 3A) of 80 v., 1 kc. is applied to the element 10 with the switch S turned to the position *b*, after a sufficiently high residual polarized field has been formed within the layer 1 by turning the switch S to the position *a*, that is, by applying a DC voltage of 400 v. ($V_{B2}$) to the element for one second in such polarity that the electrode 2 is positive against the electrode 3 and no AC voltage $V_A$ being applied. With this preliminary polarizing operation, the element gives out a very low output $L_2$ as compared with that shown in FIG. 3B which is an output in the state of no residual polarized electric field. During the existence of this residual polarized field, the DC voltage $V_{B1}$ of 140 v. which is lower than the voltage $V_{B2}$ and opposite to $V_{B2}$ in polarity, is applied to the luminescent element 10 for one second as a rectangular input signal, by turning the switch S to the position *c* with no AC voltage applied. The abovementioned residual polarized field within the layer 1 is cancelled or reduced depending on the value and the application period of the voltage $V_{B1}$. In this state, the luminescence exciting AC voltage $V_A$ (wave-form of FIG. 3A) is applied to the element for read-out by turning the switch S to the position *b*. The wave-form of resultant luminescent output $L_2$ is shown in FIG. 3D. As clearly seen from the comparison of the wave-forms of FIGS. 3C and 3D, the residual polarized field produced by the application of the voltage $V_{B2}$ is reduced or controlled by the application of the voltage $V_{B1}$ (writing-in), and thereby an amplified luminescent output is displayed.

This luminescent display of the stored signal returns to the state indicated by the wave-form of FIG. 3B as said residual polarized field becomes extinguished. The time constant of the restoration ranges from a few tens of minutes to a few hours as in the case described in connection with FIG. 2.

Erasing of the memory is achieved by applying a DC voltage $V_{B1}$ of opposite polarity and sufficient strength to cancel and extinguish the residual polarized field.

FIG. 3E is a wave-form of the luminescent output $L_2$ observed when the luminescence exciting AC voltage $V_A$ is applied to the layer after the voltage $V_{B1}$ of 400 v. was applied for one second by turning the switch S to the position *c* with no AC voltage $V_A$ applied and then turning the switch S to the position *b*. The wave-form shown in FIG. 3E is identical with the wave-form of FIG. 3B, showing that the intended erasure has been achieved. In the above-described operation, writing is performed by decrementally controlling the residual polarized field due to the preliminary polarizing voltage $V_{B2}$ with the signal voltage $V_{B1}$ of opposite polarity.

It will be noted that if the value and the application time of the writing signal voltage are selected so that the residual polarized field is not completely cancelled nor extinguished, the luminescent output $L_2$ will be controlled in incremental sense in relation to the value of the writing signal if the application period is fixed. If the value and the application period of the writing signal voltage are larger than those required for the complete cancellation of the residual polarized field due to the preliminary polarization, the luminescent output $L_2$ will have only one identical value as shown by the wave-forms of FIGS. 3B and 3E. Therefore, it is sufficient for the voltage of the writing signal $V_{B1}$ to be equal to or lower than the preliminary polarizing voltage $V_{B2}$, if the application period of the writing signal is appropriately long.

According to the results of the experiments described in connection with FIGS. 2 and 3, polarization of the AC–DC EL layer by the application of the DC voltage $V_{B1}$ or $V_{B2}$ reaches a specific saturation value depending on the value and polarity of the voltage after a certain application period. Therefore, if the periods required for the preliminary polarization, writing-in and erasing are limited to the above-mentioned saturation period, the polarization of the AC–DC EL layer 1, formation of the residual polarized electric field and the controlling effects will be dependent on the product of the value of the DC voltage $V_{B1}$ or $V_{B2}$ and the application period of the voltage in the respective operations mentioned above.

In such limited cases, the operating conditions should be selected in view of the product of the value of the voltage and the application time, whereas in the examples described relating to FIGS. 2 and 3, the preferred operating conditions have been selected taking into consideration almost only the values of the voltages $V_{B1}$ and $V_{B2}$, assuming for convenience sake that the periods of said operations are sufficiently long in relation to the saturation period.

In the above embodiments, it was assumed that the luminescence exciting AC voltage $V_A$ is kept zero during the respective operations of the preliminary polarization, writing and erasing.

However, it was known from experiments that the application of the luminescence exciting AC voltage $V_A$ for reading-out of the stored signal is entirely independent from the effects of the preliminary polarization, writing and erasing, not giving any influence to the effects of said operations. Therefore, it is possible to apply the exciting AC voltage $V_A$ for monitoring the luminescent output $L_2$ during at least one of the operations of the preliminary polarization, writing and erasing, when necessary. Further, even continuous exciting of the element 10 will be possible. Moreover, during the existence of the residual polarizing field, repeated read-out of the stored signal is possible by repeated application of the AC voltage $V_A$.

In the above embodiment, external short-circuiting of the electrodes 2 and 3 is prevented, for example, by the capacitor 9 in FIG. 1, during the times other than the periods for the preliminary polarization, writing and erasing. In said times, however, the memory effect in the AC–DC EL layer 1 is not much affected by the short-circuiting of the external DC circuit between the electrodes 2 and 3. Therefore, it is possible in FIG. 1 to remove the capacitor 9 and to connect the switch terminal corresponding to the position *b* to the electrode 3. The elimination of the capacitor 9 is especially preferable when the unidirectional voltages for the preliminary polarization, writing and erasing are pulse-shaped, as voltage leakage through the capacitor 9 is prevented.

Further, if the exciting AC voltage $V_A$ is made variable, it will be advantageous as the level of luminescent output $L_2$ can be freely controlled for easy reading.

Moreover, if the DC voltage sources ($V_{B1}$, $V_{B2}$) for the preliminary polarization, writing and erasing are made variable, it will provide a very effective means for varying or controlling the operating characteristics of memory and luminescent display, as is obvious from the fact that the writing is affected by the residual polarized field of the luminescent element 10.

It will be clear from FIGS. 2A–2D and 3A–3D that two types of luminescent pulses are produced during one cycle of the luminescence exciting AC voltage $V_A$. The ratio of variation in luminescent output in relation to the intensity of the input signal is different between said two types of luminescent pulses. In order to obtain a memory and luminescent display device of high sensitivity, it is advisable to provide means for selectively detecting only the pulses with a higher ratio of variation. This concept is applied not only to this embodiment but to the whole of the present invention. An arrangement for achieving this purpose includes a mechanical light chopper 13, as schematically shown in FIG. 1, which comprises a synchronous motor 11 and a rotating disc chopper 12 and operates in synchronization with the exciting AC voltage $V_A$. The chopper interrupts pulses of lower ratio of variation out of the luminescent output $L_2$ which contains two types of luminescent pulses and selectively passes pulses of higher ratio of variation, thus providing the luminescent output $L_2'$.

As is seen from the experimental results shown in FIGS. 2A–2D and 3A–3E, each of two types of luminescent pulses is produced depending on whether the voltage $V_A$ applied to the electrode 2 is positive-going or negative-going, the latter corresponding to the luminescent pulse with a higher ratio of variation. Therefore, the luminescent output $L_2'$ is obtained by interrupting the luminescent pulses corresponding to the positive-going amplitude of the voltage $V_A$ and selectively passing the pulses corresponding to the negative-going amplitude.

This means for high sensitivity operation is applied not only to this embodiment but to every device of this invention.

In the preceding description of this invention, the AC–DC EL layer is of the liquid type, liquid tricresyl phosphate being used as the dielectric substrate.

However, the dielectric substrate can be made of a solid material. It was found from experiments that an AC–DC EL layer of the ceramic type in which a substantially resistive glass-enamel is used for the dielectric substrate gives satisfactory results. One example of such substrate may be produced by the following process. Powder of frit, for example, of the boron-silica type containing Li and if necessary, Ti, powder of, for example, ZnS EL fluorescent material and powder of electroresistive (semiconductive) metal oxide such as $SnO_2$, $TiO_2$ or $Sb_2O_5$ which is reflective for the luminescent light from said fluorescent material, are mixed together and then the mixture is applied on an appropriate heat-resistive plate of glass, ceramic, metal or the like to be formed in a layer. Finally, the mixture with the heat-resistive plate is heated at a temperature of 600° to 700° C. for 2 to 8 minutes to fuse the powder of frit. Thus, the ceramic type AC–DC EL layer comprises EL fluorescent material contained within a dielectric substrate which consists of a ceramic (glass enamel) material containing at least Li and if necessary, Ti and which contains substantially resistive metal oxide. An AC–DC EL layer having a specific resistivity of $10^7$ to $10^{10}$ ohm cm. gives satisfactory results.

Figure 4:
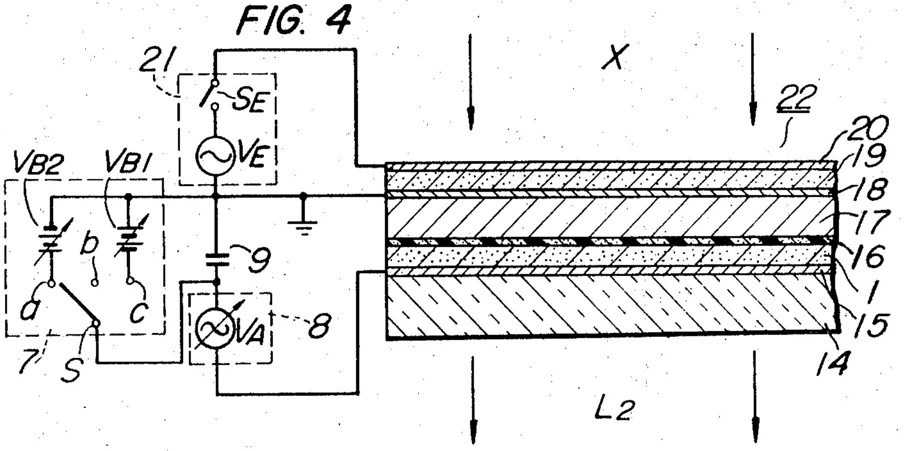
FIGS. 4 and 5 are sectional views illustrating the construction of the luminescent element shown with connection diagrams in other embodiments of the luminescent memory and display device of this invention.

FIG. 4 is a sectional view of the luminescent element of another embodiment of the memory and luminescent display device of this invention shown with the related electric connection diagram. Elements with a similar function as those shown in FIG. 1 are indicated by the same reference numerals. In the embodiment shown in FIG. 4, writing of an incident signal is performed utilizing the variation in the electric resistance of the layer 17 in the luminescent element 22 by the incident energy signal *x*. An X-ray image is used for incident energy signal *x*, and a photoconductive layer is used for the energy-responsive layer 17.

In FIG. 4, numeral 14 indicates a light-pervious support plate of glass or the like coated with a light-pervious layer 15 of tin oxide or the like which is used for an electrode; numeral 1 is the AC–DC EL layer of the liquid or ceramic type as previously mentioned, having a thickness of 50 to 100 microns: and numeral 16 is an electroresistive light-interrupting layer of 5 to 7 microns in thickness, which is formed by a plastic binder mixed with powder of carbon or by heating a mixture of glass enamel and black pigment. Numeral 17 indicates a layer comprising photoconductive material such as CdS, CdSe or CdS–CdSe which decreases the electric resistivity in response to incident X-rays *x*, such material being mixed with a binder such as a plastic binder or glass enamel, or being directly sintered. The thickness of the layer 17 is selected to be about 100 to 200 microns, and the maximum dark resistance across the thickness is set at a valve appropriately higher than the combined resistance of the layers 16 and 1.

EL layer 19 which luminesces in response to incident energy, that is, X-rays, is composed so as to luminesce also in response to the applied voltage. This layer comprises powder of X-ray fluorescent material such as ZnCdS and powder of EL fluorescent material such as ZnS or ZnSe, both powders being mixed with, for example, a plastic binder and being applied in a thickness of about 50 microns. Materials for the layer 19 and for the layer 17 are selected so that the luminescent spectrum range of the layer 19 and the photoconductive spectrum range of the layer 17 at least partly overlap.

The electrode 18 which is pervious to the incident energy $x$ and to the luminescent light from the layer 19, is formed of a vapour-deposited layer of an appropriate metal such as Au.

X-rays (incident energy)-pervious electrode 20 is formed of a light reflective layer such as Al foil.

AC voltage source 21 for exciting the X-ray responsive EL layer 19 is connected across the electrodes 18 and 20 which are interposed by the layer 19, and AC voltage $V_E$ is applied and interrupted according to closing and opening of the switch $S_E$.

In this embodiment wherein the intended luminescent output $L_2$ is taken out from the face adjacent to the electrode 15 of the layer 1, voltage source 8 which supplies the luminescence exciting AC voltage $V_A$ for reading-out of the signal stored in the layer 1, capacitor 9, and voltage source 7 which supplies the writing and erasing DC voltages $V_{B1}$ and $V_{B2}$ through the switch S, are connected across the electrodes 15 and 18.

In order to have a negative light image of an X-ray image $x$ displayed, the DC voltage $V_{B2}$ is applied across the electrodes 15 and 18 by manipulating the switch S, either the read-out AC voltage $V_A$ being supplied across the electrodes 15 and 18 or no AC voltage being supplied. In this state, short exposure to the X-ray image $x$ decreases the electric resistance of the photoconductive layer 17 by means of an X-ray luminescent image from the X-ray responsive layer 19 and the X-ray image $x$ which has passed the layer 19, and a DC voltage corresponding to the incident energy is imposed on the AC–DC EL layer 1, thereby the voltage pattern being written-in. Then, by turning the switch S to the position $b$ to supply the AC voltage $V_A$ for reading-out, a negative light image $L_2$ corresponding to the residual polarized field pattern replay. One is to excite the layer 1 directly with a capacitive lated to said voltage pattern is displayed.

In this case, there are two ways of luminescent display. One is to excite the layer 1 directly with a capacitive AC current drawn through the layer 17, the AC voltage $V_A$ being set at an extremely high value. The other is to excite the layer 1 with the AC photoelectric current which is a result of decreased AC impedance of the layer 17 owing to the EL luminescence caused by applying the AC voltage $V_E$ to the layer 19, the voltage $V_A$ being set at an appropriate value and the switch $S_E$ being short-circuited. By the latter method in which the AC photoelectric current is utilized, more eflective luminescent read-out of the layer 1 is possible with a comparatively low value of the AC voltage $V_A$. Further, if the AC voltage $V_A$ is set so that the layer 1 does not luminesce when the layer 17 is receiving no light and the voltage $V_E$ is applied to the layer 19 by manipulating the switch $S_E$, thus the layer 17 being uniformly excited with the EL luminescence to reduce the impedance and the layer 1 being caused to luminesce with the AC photoelectric current, then the luminescent read-out of the stored signal can be freely carried out by controlling $S_E$ and $V_E$.

Erasing of the memory is performed according to the following procedure: the layer 19 is caused to luminesce by closing the switch $S_E$, thereby the electric resistance of the photoconductive layer 17 being uniformly decreased, and then the voltage $V_{B1}$ which is the opposite of the voltage $V_{B2}$ in polarity is applied by turning the switch to the position $c$ to extinguish the residual polarized field pattern within the layer 1.

Luminescent display of a positive image of the incident X-ray image can also tbe performed according to the principle described in connection with FIG. 1. Namely, the AC voltage $V_E$ is applied to the layer 19, the electric resistance of the photoconductive layer 17 being uniformly reduced with the EL light from the layer 19. In this state, the DC voltage $V_{B2}$ is applied across the electrodes 15 and 18 to provide a preliminary polarization uniformly in the layer 1. Then, the voltage $V_E$ is removed and the voltage $V_{B1}$ is applied across the electrodes 15 and 18 as a writing-in voltage, followed by a short exposure to the X-ray image $x$. Thus, the voltage pattern being given to the layer 1 and the residual polarized field of the preliminary polarization being decrementally controlled, the writing-in operation is completed. Monitoring of the luminescent output $L_2$ during the above operations can be performed by applying the voltage $V_A$. The ensuing operations are the same as those for the previously described negative display of the stored luminescent signal.

In the second method of the positive display, the voltage $V_{B1}$ is applied in such manner that the electrode 15 is negative against the electrode 18, contrary to that in the above-mentioned method. Then, the incident X-ray image $x$ is projected for a short period and the voltage $V_{B1}$ is cut off after the voltage pattern has been applied to the layer 1. In this manner, a residual polarized field pattern of a polarity opposite to that in the above-described negative display is written-in. In this state, application of the AC voltage $V_A$ does not cause any change in the luminescent output $L_2$. So, the voltage $V_E$ is applied to uniformly decrease the electric resistance of the layer 17 and concurrently, the voltage $V_{B2}$ of a polarity opposite to that of the voltage $V_{B1}$ is applied across the electrodes 15 and 18 to reverse the polarity of the residual polarization in so far as the written field pattern is not erased, that is, to cause the after-process polarization reversal.

If the application time of the voltage $V_{B2}$ is too long, the written field pattern will be completely erased, though the polarity of the residual polarized field is reversed. Therefore, the application period of the voltage $V_{B2}$ is limited to a range, within the saturation time of the polarization, in which at least the field pattern is not extinguished and the polarity of at least one portion of the residual polarized pattern is reversed.

The reversely polarized pattern of the residual polarized field forms a field intensity pattern for the incident X-ray opposite to that in the above-mentioned negative display. Thus, by applying the AC voltage $V_A$ with the switch S turned to the position $b$, a positive light image $L_2$ is displayed (read-out). Erasing is performed in entirely the same manner as that described previously.

In such after-process polarization reversal, it is preferable to utilize DC pulses instead of the voltage $V_{B2}$ so that the electrode 15 has positive potential.

A satisfactory operation of the after-process polarization reversal is easily attained by monitoring the luminescent output $L_2$ with the AC voltage $V_A$ applied while applying the voltages $V_{B2}$ and $V_E$ and by removing the voltage $V_E$ by means of the switch $S_E$ when a clear positive image appears.

In the above-described three types of operations, further correction of the residual polarized field pattern which has been ultimately formed or controlled, is possible. That is, uniform DC pulses for correction are appropriately applied in such manner that the intended luminescent output side or the electrode 15 is either positive or negative contrary to the opposite side, in such period that the residual polarized field pattern is not erased. Thus, the average intensity of the field of the residual polarized field pattern can be corrected.

Referring to this embodiment, operation of this correction is carried out by applying the voltages $V_{B1}$ and $V_{B2}$ by means of the switch S and further applying the voltage $V_E$ by means of the switch $S_E$ while monitoring the output $L_2$ with the voltage $V_A$ applied. Such operations provide desirable effects, making the contrast of the luminescent output adjustable and further making the duration of the memory controllable.

Figure 5:
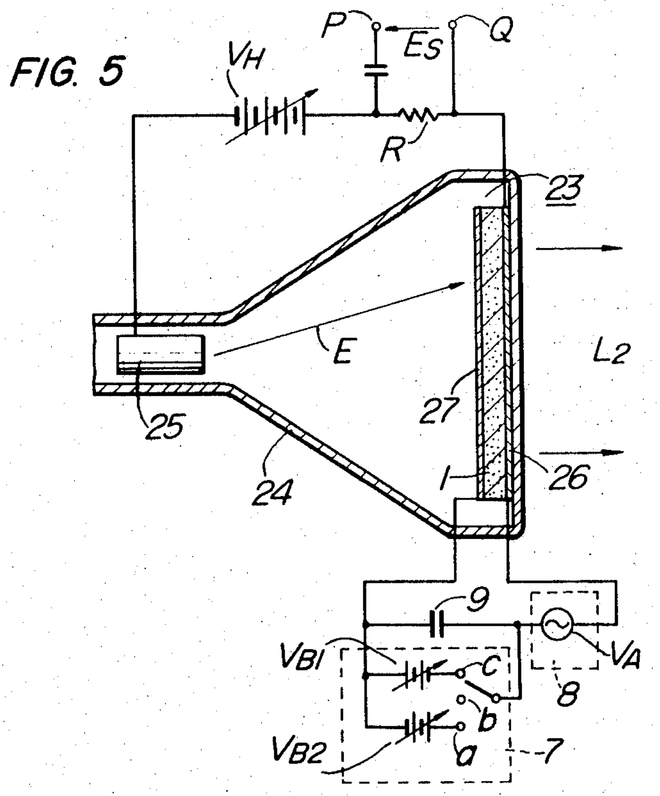

FIG. 5 is a sectional view of another embodiment of the memory and luminescent display device according to this invention shown with the electric connection diagram.

The luminescent element 23 is contained within a vacuum enclosure 24 made of glass or the like. Writing-in is performed by an electron beam E which is modulated by an electric signal at the electron gun and accelerated by the voltage $V_H$.

The luminescent element 23 comprises AC–DC EL layer 1 of 30 to 50 microns in thickness, for example, of the previously described ceramic type interposed between the electron beam pervious electrode 27 and the light-pervious electrode 26 of tin oxide or the like applied on the vacuum enclosure 24 made of, for example, glass. Writing-in by means of the scanning electron beam E is done in the electrode 27 side of the element while the intended luminescent image $L_2$ is taken out from the electrode 26 side. The electrode 27 is made of a vapour-deposited thin film, for example, of Al, or electroconductive paint of metal deposited glass enamel binder, or thin wire of a metal, and is formed in grid, net or other gappy formation so that the layer 1 can be excited with the beam E. The voltage sources 7 and 8 which are similar to those explained in connection with the previous embodiment and the capacitor 9 are connected across the electrodes 26 and 27. As is seen from FIG. 5, when the scanning electron beam E impinges on the element in a low speed with the accelerating voltage being properly adjusted, a unidirectional voltage is applied to the layer 1 in proportion to the modulation rate determined by the electric signal of the electron beam E, the polarity of said voltage being such that the electrode 26 side of the element is positive contrary to the electrode 27 side, thus the signal being written-in. However, when a high speed electron beam is involved, then the polarity of said voltage is reversed. It will be understood taking into consideration the residual polarized field pattern of the layer 1 due to said writing-in that if the required operations including the preliminary polarization, writing-in, after-process polarization reversal, correcting polarization and erasing are performed according to the principle explained in connection with FIGS. 1 and 4, a negative or positive light image $L_2$ corresponding to the image scanned by the electron beam will be displayed according to the residual polarized field pattern of the layer 1 which has been written by the scanning electron beam E.

Further, if a secondary electron emitting material such as MgO is mixed to the AC–DC EL layer 1, this is very advantageous as the sensitivity is raised, for example, in the writing-in by a high speed electron beam.

It will be noted that the AC–DC EL layer 1 holds residual polarization according to the intensity of the beam at the time of writing-in. Therefore, if electro-resistive element R is connected as shown in FIG. 5 and the element 23 is scanned with electron beam E of a fixed intensity to read-out the residual polarization of the layer 1, the electric signal $E_S$ will be obtained between the terminals P and Q.

According to the above-mentioned principle, signal of the scanning electron beam can be read-out, besides the previously described luminescent display. It will be noted that if the object of this device is limited to the memory of an electric signal, mixing of EL fluorescent material into the layer 1 is not necessarly required, but the layer 1 can be composed only of the previously described dielectric substrate or further of the secondary electron emitting material. The device of this embodiment is useful for memory and observation of wave-forms of various signals, low electron speed television, etc.

Various DC voltage sources such as $V_{B1}$ and $V_{B2}$ in the above embodiments can be substituted by unidirectional pulse voltage sources.

Though the above description has been given in connection with three types of embodiments, it will be understood that this invention is applicable to any embodiment in which a unidirectional voltage or electric field can be imposed on the AC–DC EL layer. For example, writing-in by piezoelectric means, photoelectron emitting means, ionization due to radiation and other various means are included in the scope of this invention.

As stated above, this invention provides means for prolonged memory and luminescent display of various input signals and further can provide display in an intermediate tone. Moreover, erasing of memory, reversal of image and adjustment of contrast can be easily performed in the device of this invention.

What is claimed is:

1. A luminescent memory and display device comprising, in combination, an electroluminescent cell formed of an electroluminescent material in a dielectric matrix disposed between a pair of electrodes, of which at least a first electrode is light-pervious, said dielectric matrix having a property such that said matrix supports an internal electric field upon the application of an external polarizing unidirectional voltage and maintains a residual component of said electric field upon the removal of said external polarizing voltage; means for first applying a first D.C. voltage as said external polarizing voltage to said electroluminescent cell in such polarity that said first electrode is positive relative to the opposite or second electrode and then removing said first D.C. voltage; means for thereafter applying to said cell a second D.C. voltage which is of a polarity opposite said first D.C. potential and of such magnitude as to modulate the residual internal electric field due to said first D.C. voltage; means for thereafter applying to said cell a third voltage which is of the same polarity as said second voltage and of a magnitude sufficient to erase any residual internal electric field; and means for applying an A.C. voltage to said cell to excite said cell at least during a period between the application of said second voltage and the application of said third voltage.

2. A luminescent memory and display device as defined in claim 1, wherein means for applying said first, second and third D.C. voltage and said A.C. voltage include two D.C. voltage sources, an A.C. voltage source, switch means and a capacitor, said D.C. voltage sources being alternately connectable in series with said A.C. voltage source through said switch means in mutually opposite polarity, and said capacitor being connected across said D.C. voltage sources.

3. A luminescent memory and display device as defined in claim 1, wherein an energy-responsive layer which varies the electric resistance thereof in response to an incident energy is interposed between said electroluminescent layer and the second electrode of said cell.

4. A luminescent memory and display device as defined in claim 3, wherein said second electrode also is light-pervious and an energy-responsive electroluminescent layer which luminesces in response to an incident energy is provided on and outside said second electrode and further provided is means for activating said energy-responsive electroluminescent layer.

5. A luminescent memory and display device as defined in claim 1, which is disposed within a vacuum enclosure with said first electrode facing outwardly and is adapted so as to be scanned with an electron beam modulated according to a signal.

6. A luminescent memory and display device as defined in claim 1, including means for selecting one of two wave-forms which alternately appear in the output luminescent pulses, in synchronization with said A.C. voltage for exciting said luminescent cell.

7. A luminescent memory and display device as defined in claim 1, wherein said dielectric matrix comprises tricresyl phosphate.

8. A luminescent memory and display device as defined in claim 1, wherein said electroluminescent material is an electroluminescent fluorescent material and said dielectric matrix comprises a ceramic material containing lithium.

References Cited

UNITED STATES PATENTS

| | | | |
|---|---|---|---|
| 3,199,086 | 8/1965 | Kallmann et al. | 340—173 |
| 3,235,850 | 2/1966 | Kallmann et al. | 340—173 |
| 3,110,763 | 11/1963 | Lieb | 340—173X |

OTHER REFERENCES

H. F. Ivey et al.: "Radiation, Fields, and Electroluminescent Phosphors," Westinghouse Engineer, September 1959, pp. 134–138.

TERRELL W. FEARS, Primary Examiner

U.S. Cl. X.R.

96—1; 313—92; 346—74